Figure 1:
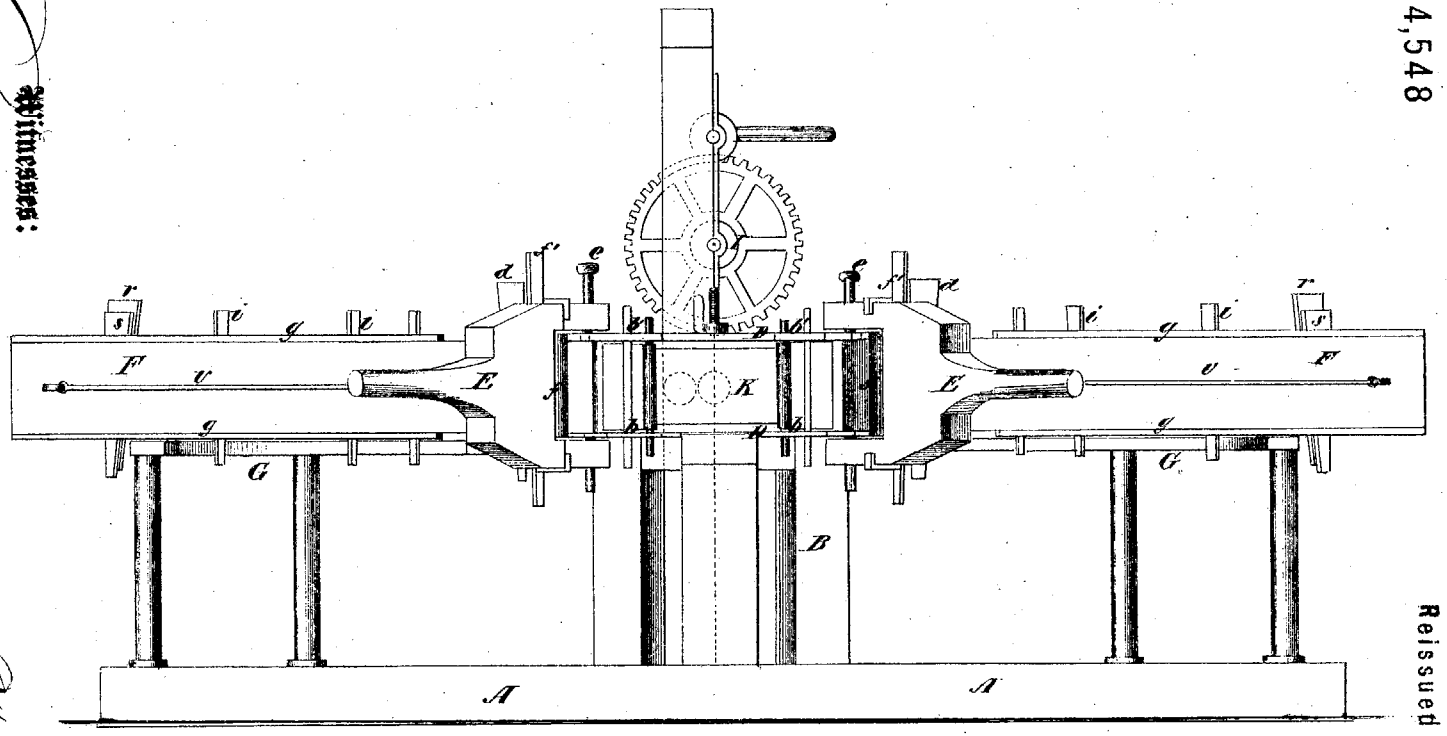

Sheet. I. 2 Shts.

[125.]

H. McDONALD.

Improvement in Wood Bending Machines.

No. 4,548 Reissued Sep. 12, 1871.

Witnesses:

Gustave Dieterich

Francis McArdle

Inventor:

H. McDonald per Munn & Co.

Attorneys.

AM. PHOTO-LITHOGRAPHIC CO. N.Y. (OSBORNE'S PROCESS.)

Sheet 2. H. McDONALD. 2 Shts
[125.]
Improvement in Wood Bending Machines.
No. 4,548 Reissued Sep. 12, 1871.
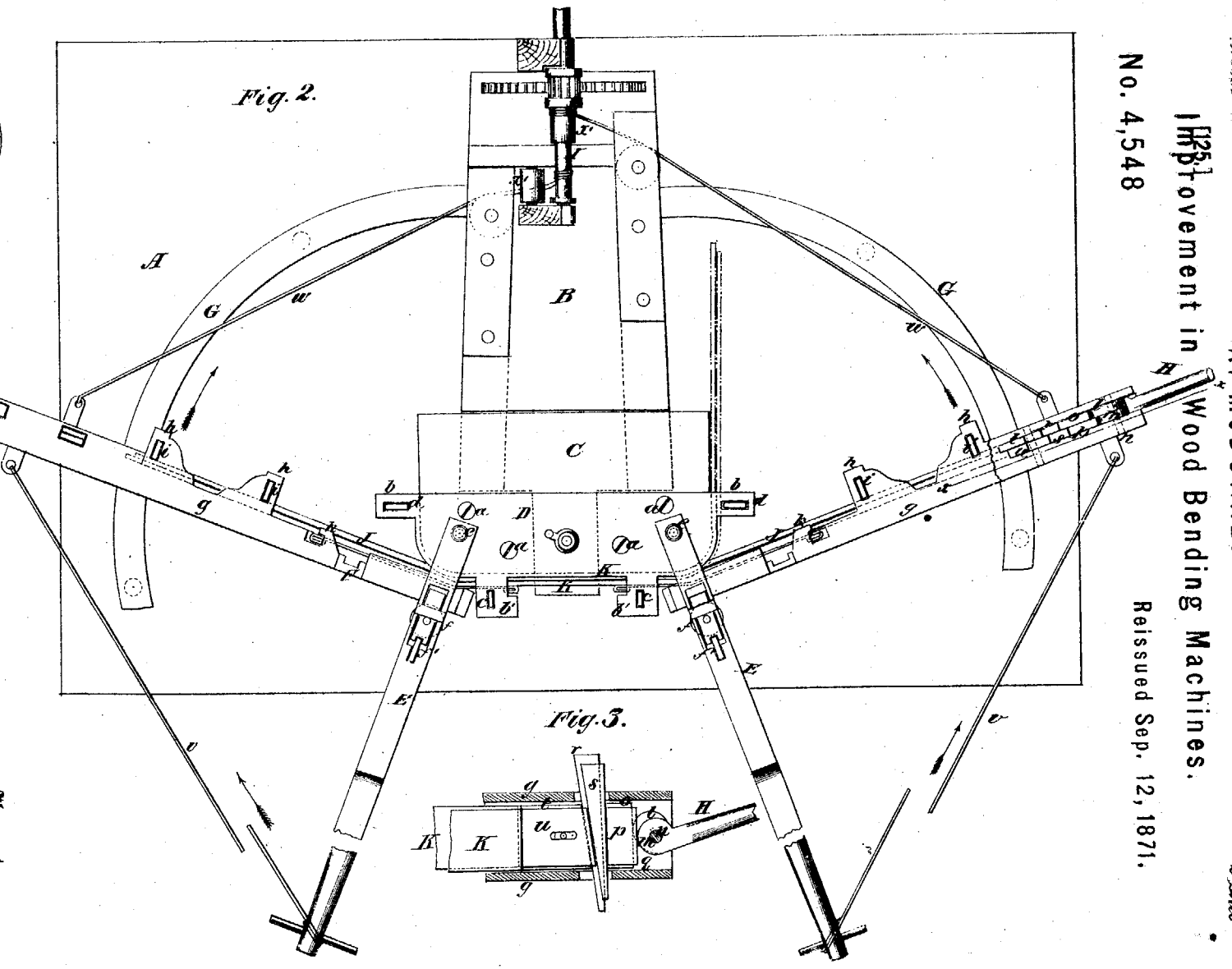
Witnesses:
Gustave Dieterich
Francis McArdle
Inventor:
H. McDonald.
Per Munn & Co.
Attorneys.
AM. PHOTO-LITHOGRAPHIC CO. N.Y. (OSBORNE'S PROCESS.)

UNITED STATES PATENT OFFICE.

HIRAM McDONALD, OF SHORTSVILLE, NEW YORK.

IMPROVEMENT IN WOOD-BENDING MACHINES.

Specification forming part of Letters Patent No. 31,182, dated January 22, 1861; reissue No. 4,548, dated September 12, 1871.

*To all whom it may concern:*

Be it known that I, HIRAM McDONALD, of Shortsville, in the county of Ontario and State of New York, have invented a new and Improved Machine for Bending Wagon-Bows and other articles of Wood; and I do hereby declare that the following is a full, clear, and exact description thereof, which will enable others skilled in the art to make and use the same, reference being had to the accompanying drawing forming part of this specification, in which—

Figure 1 is an elevation of my invention. Fig. 2 is a plan or top view of the same. Fig. 3 is a section of a portion of the same taken in the line *x x*, Fig. 2.

Similar letters of reference indicate corresponding parts.

This invention has for its object the bending of steamed wood, such as wagon-bows, fellies, &c., into proper shape by a very expeditious and simple means and in perfect manner. The invention consists in the employment or use of swinging or movable beds in connection with pressure-rollers, upsetting-device, and straps, arranged essentially as hereinafter described, whereby the desired end is attained.

To enable those skilled in the art to fully understand and construct my invention, I will proceed to describe it.

A represents the bed-piece or base of the machine, and B is a block secured thereto in any proper manner. The drawing represents a machine for bending wagon-bows, and the mold C corresponds in form to the bent portion of the said bows. In the upper and under side of the mold C there are secured, by screws *a*, metallic plates D D, and these plates have projecting lugs or ears *b b′*, through which keys *c c d d* pass, and to the molds C there are attached, by pins or bolts *e*, levers E E, each lever having a roller, *f*, fitted in it near its inner end. F F are beds, the inner ends of which are fitted between the mold C and the inner sides of the roller *f*, within the levers E E. The outer parts of the beds F rest upon curved guides or supports G G. The beds F have metal plates *g* attached to their upper and lower surfaces, and these plates have lugs or projections *h*, through which keys *i i* pass, and said plates *g* also have hooked-shaped projections K, shown in Fig. 2. In the outer part of each bed F there are placed two eccentrics, *l m*, which are placed on a common axis, *n*; each pair of eccentrics has a lever, *h*, attached to them. The eccentrics of each pair have a slightly different position or form, *l* being more prominent than *m*, as shown clearly in Fig. 3. The eccentrics *l m* bear against sliding plates *o p*, which are fitted in boxes *q* at the outer ends of the beds F F, and *r s* are keys, which are interposed between the plates *o p* and slides *t u*, which latter are also fitted in the boxes *q*. (See Fig. 3.) The outer ends of the levers E E are connected by cords or chains *v* with the outer ends of the beds F F, and the outer ends of said beds have cords or chains *w* attached, which pass around rollers *x x* at the front part of the block B and are attached to a windlass, I. (See Fig. 2.) J J are metal straps, one end of which is fastened in the hooked-shaped projections K of the plates *g* and the opposite ends fastened in the projections *b′* of the plates D D. (See Fig. 2.)

The operation is as follows: The wood K to be bent, after being steamed, is fitted to the beds F F and secured thereto by the keys *i*. There are two strips, K K, of wood secured to the bed at the same time, the strips being placed side by side, or one within the other, as shown in red in Fig. 2, and the ends of said strips bear against the slides *t u* in the boxes, the slides being brought up snugly against the ends of the strips K by means of the keys *r s*; the straps J J are then placed in proper position, one end being attached to the plate D of the mold and the other end to the beds F F, and the straps J J are strained or drawn tight by driving up the keys *r s*. When the strips K K are secured in proper position to the beds F F the windlass I is turned and the beds F F, with the levers E E, are turned in the direction indicated by the arrow in Fig. 2, and the strips K K are bent around the mold C, the roller *f* bearing against the outer side of the beds F and keeping the strips snugly to the mold. The straps J J bear against the outermost strip K at its curvatures. As the strips K K are bent the eccentrics *l m*, which serve as stops for "upsetting" the wood, are very gradually relaxed, and as the outermost strips K are necessarily longer than the innermost one, it will be seen that the difference in the form of the eccentrics *l m* is important in order that the relaxing of the upsetting-device will be the same for both strips, and both strips bent and upset in a uniform manner. The strips K K are shown bent at one side of the mold C. The rollers I may be adjusted in the levers E by means of keys $f'$. The arrangements of the eccentrics $l$ $m$ and their adjuncts, the slides, plates, and keys, therefore, greatly expedite the work or bending process—in fact just double the speed, as two strips may be bent simultaneously, and the arrangement of the levers E E with their rollers $f$ and the beds F insure the snug fitting of the strips to the mold. When two strips, K K, are bent around one mold, C, the former are secured to the latter by the keys $c$ $c$ $d$ $d$ and the mold C is removed, another secured to the block B, and the process repeated; but, with one eccentric and the adjuncts therefor, the bending may be carried on singly to advantage.

I do not claim, broadly, the upsetting of wood during the bending operation—that is to say, the preventing of longitudinal separation of the wood at its outer or greater part of the curve by compressing the fibers at the inner or shorter part of the curve, for such has been previously done; but I do claim as new, and desire to secure by Letters Patent—

1. The eccentric $l$ $m$, sliding plates $o$ $p$, slides $t$ $u$, and the keys $r$ $s$, either in pairs or one of each, placed at the outer parts of the beds F F, and arranged substantially as and for the purpose herein set forth.

2. The combination of the former C, beds F, levers E, and adjustable rollers $f$ and straps J, all substantially as specified.

3. The combination of the former C, straps J, and beds F, when said straps are connected to the former and the beds, substantially as specified.

HIRAM McDONALD.

Witnesses:
EZRA PEIRCE,
EDWIN E. PRATT.

(125.)